United States Patent [19]
Buckley

[11] Patent Number: 5,400,743
[45] Date of Patent: Mar. 28, 1995

[54] PET SHELTER WITH REMOVABLE WALLS

[76] Inventor: Allen Buckley, 3351 Lee St., Smyrna, Ga. 30080

[21] Appl. No.: 190,667

[22] Filed: Feb. 2, 1994

[51] Int. Cl.⁶ .............................................. A01K 1/02
[52] U.S. Cl. ........................................ 119/19; 119/17
[58] Field of Search .................................. 119/19, 17

[56] References Cited

U.S. PATENT DOCUMENTS

| | | |
|---|---|---|
| 1,484,518 | 2/1929 | Meadows ................ 119/19 |
| 1,941,662 | 1/1934 | Cunningham ........... 119/19 |
| 2,445,055 | 7/1948 | Capaul .................... 119/19 |
| 2,534,492 | 12/1950 | Williams ................ 119/19 |
| 2,680,327 | 6/1954 | Harper .................... 119/19 |
| 2,728,114 | 12/1955 | Gant ....................... 119/19 |
| 3,026,844 | 3/1962 | Spindler ................. 119/19 |
| 3,324,831 | 6/1967 | Onge ...................... 119/19 |
| 3,618,568 | 11/1971 | Breeden ................. 119/19 |
| 3,797,461 | 3/1974 | Breeden ................. 119/19 |
| 3,866,577 | 2/1975 | Mathis .................... 119/19 |
| 4,109,427 | 8/1978 | O'Brian et al. ......... 119/19 |
| 4,224,899 | 9/1980 | Cruchelow et al. .... 119/19 |
| 4,807,808 | 2/1989 | Reed ....................... 119/19 |
| 4,827,872 | 5/1989 | Sommers ................ 119/19 |
| 5,081,956 | 1/1992 | Greitzer et al. ......... 119/19 |
| 5,115,762 | 5/1992 | Long ....................... 119/19 |
| 5,121,710 | 6/1992 | Gonzalez ................ 119/19 |
| 5,144,910 | 9/1992 | Darby ..................... 119/17 |
| 5,148,767 | 9/1992 | Torchio ................... 119/19 |

*Primary Examiner*—Paul J. Hirsch
*Attorney, Agent, or Firm*—Deveau, Colton & Marquis

[57] ABSTRACT

A pet shelter with selectively removable walls, a rectangular base, and a gabled roof supported by vertical columns, the selectively removable walls including two side walls, a rear wall, and a front wall, all of which are easily removable so as to convert the pet shelter from a pavilion-like, open-air structure to a substantially enclosed structure and vice versa as climatic conditions dictate.

3 Claims, 2 Drawing Sheets

PET SHELTER WITH REMOVABLE WALLS

BACKGROUND OF THE INVENTION

1. Field of the Invention

The present invention generally relates to the field of shelters for animals. In particular, this invention relates to a pet shelter which may be converted from an open-air covering for use during warm weather to a weatherproof structure for use during cold or inclement weather.

2. Description of the Prior Art

Numerous types of pet shelters have heretofore been designed and constructed. The traditional doghouse is an example generally having a roof, four walls, and a door opening in a front wall. While the traditional doghouse affords basic protection from the elements, the design provides only limited fresh air ventilation to the interior of the structure. Adequate fresh air ventilation is essential to the health and well-being of a pet. Insufficient ventilation can make the shelter uncomfortable or even uninhabitable during hot summer months, while too much ventilation may result in inadequate protection from the elements during cold or inclement weather.

Doghouses have been designed with various window configurations to promote ventilation within the structure. Alternate designs, such as that illustrated by U.S. Pat. No. 5,081,956, incorporate ventilation channels into the structure of the shelter. However, both designs suffer from similar disadvantages. First, the ventilation provided is fixed and incapable of being adjusted to compensate for seasonal changes or weather variations. This may result in a shelter which is too cold and drafty for winter use, yet too hot and stuffy for use in warmer weather. Second, existing designs are incapable of being converted to an open, pavilion-like structure to provide shade and rain cover for the pet, while allowing fresh air to ventilate through the structure.

U.S. Pat. No. 5,144,910 discloses a dog transportation box with removable side walls which are imperforate and a method of converting a transportation box from a ventilated configuration to a substantially imperforate configuration. However, the disclosed invention requires side walls having longitudinally spaced vertical structural members (as in a cage) which restrict the pet's access to the transportation box when the doors of the transportation box are closed.

Thus, there is a need for a pet shelter designed to permit the pet owner to adjust the degree of ventilation provided by the shelter and allow for conversion from a closed, weatherproof shelter to an open-air covering.

SUMMARY OF THE INVENTION

The present invention meets the needs identified above by providing a convertible pet shelter for conversion to and from alternate use as a substantially completely enclosed shelter and an open-air shelter. The pet shelter comprises a rectangular base; four vertical support beams each being attached at their bottom portions to the corners of the base; a generally A-shaped roof mounted on the top portions of the four vertical support beams; and four removable walls with means for attachment both to and between two adjacent vertical support beams. One of the four walls may have an opening for access by the pet to the convertible pet shelter.

One or more walls may be removed from the pet shelter of the present invention to increase ventilation within the shelter. Conversely, a more weatherproof shelter may be provided by reattaching the walls.

Accordingly, it is a primary object of the present invention to provide a pet enclosure which may be converted to provide a complete enclosure preventing the escape of an animal, a partial enclosure, or a pet house providing complete freedom of access by the pet.

It is another object of the present invention to provide a pet house which may be easily modified to allow and adjust circulation of fresh air.

A further object of the present invention is to provide an enclosure which may serve as a sleeping, resting, and feeding area for a pet.

It is still another object of the present invention to provide a pet house which may be easily assembled and disassembled.

These and other objects, features, and advantages of the present invention will become apparent upon reading the following specification in conjunction with the accompanying drawing figures.

DETAILED DESCRIPTION

The present invention is directed to a convertible pet shelter having removable wall panels. The specific embodiments now described are by way of example only, and merely illustrative of many possible specific embodiments which are within the scope of the present invention.

Figure 1A:
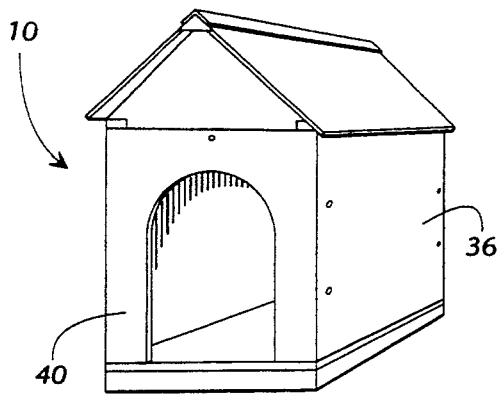
FIG. 1A is a perspective view of a first preferred embodiment of the pet shelter of the present invention configured for winter or inclement weather usage.
Figure 1B:
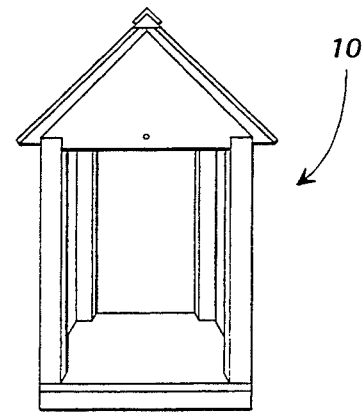
FIG. 1B is a perspective view of a second preferred embodiment of the pet shelter of the present invention configured for summer or warm weather usage.

Referring now to the drawing figures wherein like reference numbers denote like parts throughout the several views, FIG. 1A shows the convertible pet shelter 10 of the present invention configured for usage during the winter months or when the weather is otherwise inclement. FIG. 1B shows an alternate embodiment of the present invention in the form of a generally open-air enclosure for usage during the summer months or during warm weather. The embodiment shown in FIG. 1A includes all of the components of the embodiment depicted in FIG. 1B with the addition of two side walls 36, a rear wall 38 (not visible in this view), and a from wall 40.

The novelty of the present invention lies in the fact that side walls 36, rear wall 38, and front wall 40 may be selectively installed or removed with minimal effort so as to obtain the configurations of FIGS. 1A and 1B. Of course, any number of the walls depicted in FIG. 1A may be removed to obtain any desired configuration. For example, one may assemble an embodiment within the scope of the present invention (though not shown in the drawings) consisting of the configuration of 1B and one side wall 36 along with a front wall 40.

The materials of construction for the present invention preferably include wood components such as plywood fastened by wood screws, nuts, bolts, and washers. These materials tend to facilitate ease of construction and aid in installation and removal of the side walls 36. However, it will be clear to those skilled in the art that various other materials and fasteners may be used. For example, the pet shelter of the present invention may also be constructed of any rigid material such as plastic, metal, fiberglass, or sheet rock along with appropriate fastening means. In addition, any desired finish may be applied to pet shelter of the present invention such as paint, wood stain, and water sealant, as appropriate, and the shelter provided with a floor covering such as indoor/outdoor carpeting.

Figure 2:
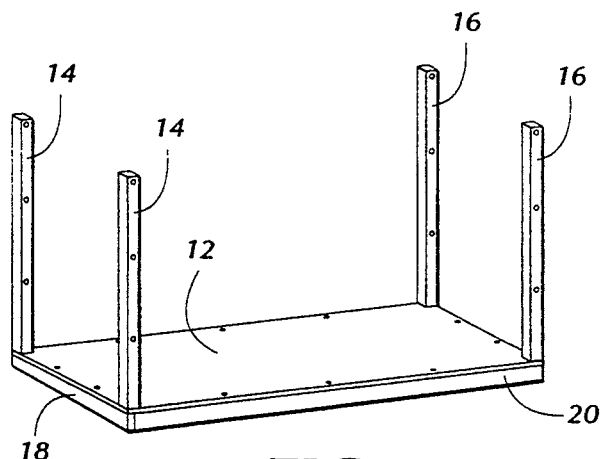
FIG. 2 is a perspective view of the pet shelter of the present invention partially assembled to show the base, columns, and base supports.

Referring now to FIG. 2, a portion of the pet shelter of the present invention is shown partially constructed. From this drawing it may be seen that the basic support structure of the pet shelter of the present invention comprises a rectangular base 12, with front support columns 14 and rear support columns 16 attached to the top surface of the base at each of the four corners of the base. As depicted in FIG. 2, the support columns 14, 16 are preferably of an elongate rectangular shape and are mounted perpendicular to the plane defined by base 12. Also shown in FIG. 2 are a pair of base width supports 18 and a pair of base length supports 20. Base width supports 18 and base length supports 20 are attached to the bottom surface of base 12 generally at the outer edge of base 12. So attached, base supports 18, 20 provide vertical support for the pet shelter 10 and raise the base 12 of the pet shelter 10 above the ground or a floor any desired height.

Figure 3:
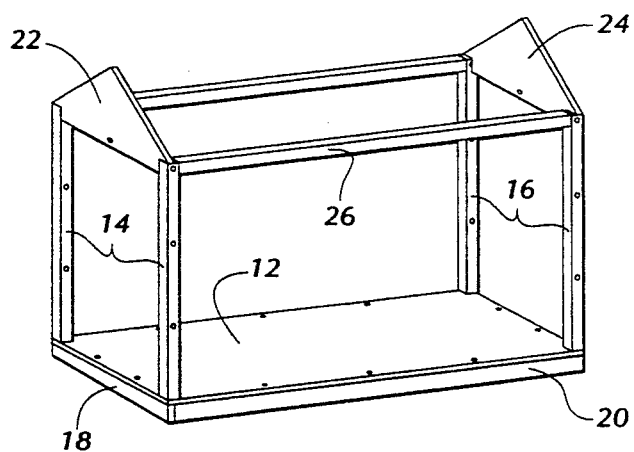
FIG. 3 is a perspective view of the present invention partially assembled to show the components of FIG. 2 in addition to the front and rear gables and the spacers connected between the gables.

Referring now to FIG. 3, the pet shelter 10 of the present invention is shown at a stage of completion which highlights a portion of the roof of the shelter. As shown, the roof comprises a front gable 22 and a rear gable 24. Gables 22, 24 are of a generally triangular shape and are separately attached to front columns 14 and rear columns 16, respectively. Gables 22, 24 are also connected to each other by two length spacers 26 which extend along the length of pet shelter 10 parallel to the two base length supports 20.

Figure 4A:
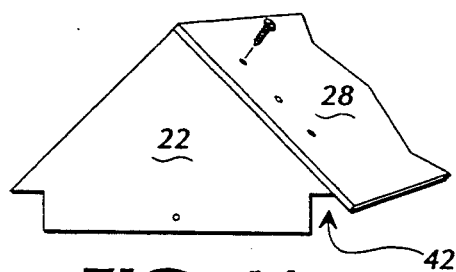
FIG. 4A is a perspective view of the roof of the present invention showing construction details for attaching the roof slopes.
Figure 4B:
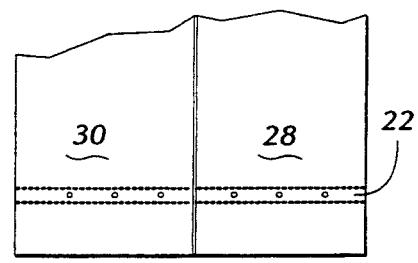
FIG. 4B is a top view of the roof of the present invention showing the points where the roof slopes are attached to the front gable.

Referring now to FIG. 4A, a partial view of the roof of the present invention is shown. This partial view shows roof slope 28 attached to front gable 22 along one side of triangularly-shaped gable 22. The manner in which roof slope 28 is connected to front gable 22 and rear gable 24 (not shown) along with the disparity in length between roof slope 28 and the sides of roof gables 22, 24 to which roof slope 28 is connected are such that an eaves 42 is created at the lower edge of roof slope 28. Although not shown in FIG. 4A, roof slope 30 is similarly attached. FIG. 4B shows a preferred location for roof slopes 28, 30 relative to front gable 22 so as to form an overhang which will cover the front wall 40 and the entrance to the pet shelter 10. Roof slope 28 is generally slightly shorter than roof slope 30 so that they may abut one another so as to form an approximate 90° apex to the roof while still presenting a symmetrical view from the front of the pet shelter 10.

Figure 5:
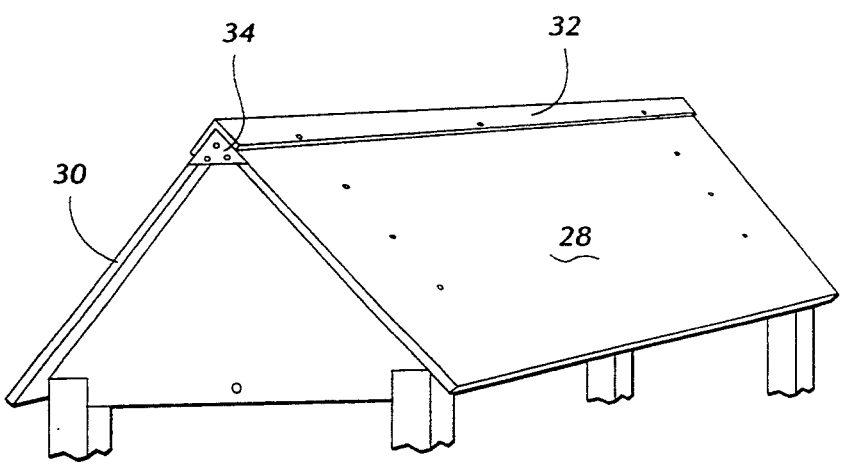
FIG. 5 is a perspective view of the roof of the present invention displaying the proper attachment of the ridgepole and a triangular support piece.

FIG. 5 shows another partial view of the roof to the pet shelter of the present invention which includes a ridgepole 32 attached along the length of the apex of the roof. Ridgepole 32 covers the abutment between roof slope 28 and roof slope 30 to prevent water from entering shelter 10 during inclement weather. Also shown are triangular support pieces 34 which are attached to roof slopes 28, 30 just beneath and adjacent to ridgepole 32 at both the front and rear of the roof. Triangular support pieces 34 provide additional structural support for the roof of the pet shelter 10.

Figure 6:
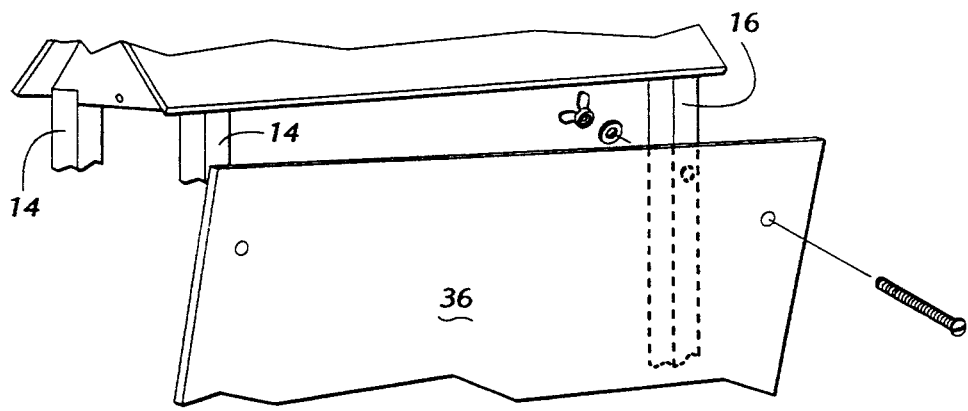
FIG. 6 is a partial view of the pet shelter of the present invention displaying the proper means for attaching a side wall.

Heretofore, the construction of the embodiment of the present invention depicted in FIG. 1B has been described. FIG. 6 shows the type of modification which must be made to convert the embodiment of the present invention depicted in FIG. 1B to the embodiment of the present invention depicted in FIG. 1A. Specifically, FIG. 6 shows a portion of the present invention including a side wall 36 which may be attached to a front column 14 and a rear column 16 to partially enclose the pet shelter of the present invention. It will be clear to those skilled in the art that another side wall 36, a rear wall 38, and a front wall 40 may also be installed to obtain the embodiment of the present invention depicted in FIG. 1A.

The pet shelter 10 of the present invention is preferably assembled according to the following method and should take one to two hours to complete. However, it will be clear to those skilled in the art that modifications may be made to the method of assembly described below without departing from the scope and spirit of the present invention. Before beginning construction, one should be equipped with the appropriate tools and fasteners such as a Phillips head screwdriver, wood screws of varying lengths, nuts, bolts, and washers.

Construction is preferably commenced by attaching from columns 14 and rear columns 16 to the corners of base 12 using 2½ inch wood screws. Then, attach the base width supports 18 to the bottom of the base 12 by screwing two 1¼ inch wood screws into the base width supports 18 while applying pressure to the base. Next, the base length supports 20 are aligned under the bottom of the length of the base 12 and three 1¼ inch wood screws are screwed in on each side while applying pressure to the base making sure that each base length support 20 is flush both against the bottom of the base 12 and with the base width supports 18 already installed. The pet shelter should appear as shown in FIG. 2 at this stage of completion.

Next, the front gable 22 and the rear gable 24 are attached to the two front columns 14 and the two rear columns 16, respectively, using 2½ inch wood screws. Then, the two length spacers 26 are attached to each of the sides of the pet shelter between a front column 14 and a rear column 16 using 2½ inch wood screws. So attached, the length spacers 26 connect the front gable 22 to the rear gable 24. Once this step is completed, the pet shelter should appear as illustrated in FIG. 3.

Construction continues by attaching roof slopes 28, 30 to roof gables 22, 24 using 1 3/8 inch deck wood screws. It is important that the apex of roof gables 22, 24 align with the upper edge of roof slope 28, 30 to appear as shown in FIG. 4A so that a right angle is formed at the apex. Next, ridgepole 32 is attached to roof slopes 28, 30 using 1¼ inch wood screws. Holes are preferably pre-drilled into ridgepole 32 and roof slopes 28, 30 for this purpose. Then, the two triangular support pieces 34 are attached to each end of the roof at the roof slopes 28, 30 just beneath and adjacent to ridgepole 32 using 1 inch wood screws as shown in FIG. 5. After completion of this step, the basic or summer version of the pet shelter is complete, and the pet shelter should appear as shown in FIG. 1B.

At this stage, the basic pet shelter 10 is completed, as shown in FIG. 1B. Configuring the basic pet shelter with the desired side walls 36 and/or rear wall 38 and/or front wall 40, as disclosed below, completes the invention. It is this combination of a basic pet shelter 10 and removable, configurable walls 36, 38, 40 which makes this invention novel.

To obtain the embodiment of the present invention shown in FIG. 1A, one simply needs to attach side walls 36 to front columns 14 and rear columns 16 eight 2½ inch bolts, washers and wing nuts. The bolts preferably go through the exterior of a side wall and then through the front and rear columns 14, 16 in predrilled holes. On the inside of the pet shelter, the washer is first put around the bolt, and then the wing nut is applied as shown in FIG. 6. After the side walls 36 have been attached, the rear wall 38 may be attached to rear column 16 using 2 inch wood screws. Finally, front wall 40 may be attached by applying bolts, washers and wing nuts, in the same manner in which the side walls 36 were installed. Once completed, the "winter" version of the present invention should appear as shown in FIG. 1A. Using bolts and wing nuts ensures that the walls 36, 38, 40 are removable at will.

Although the present invention has been described in detail with respect to preferred embodiments thereof, it will be obvious to those skilled in the art that many modifications, additions, and deletions may be made therein without departing from the scope and spirit of the invention. For example, a cloth flap may be added to an opening in the front wall 40 to provide a cover for the entrance to the pet shelter 10. Also, shingles may be added to the roof of the pet shelter to provide greater protection of the roof. Therefore, the present invention should not be judged by the specific embodiments set forth herein but rather by the scope and spirit of the invention as set forth in the following claims.

What is claimed is:

1. A pet shelter which may be converted from an open-air shelter to a substantially enclosed shelter and from a substantially enclosed shelter to an open-air shelter, comprising:
   a. a generally rectangular base having a top, a bottom, four corners, and an outer edge;
   b. four base supports attached to the bottom of said base generally at the outer edge of said base;
   c. a front column pair and a rear column pair attached to the top of the base at the corners of the base;
   d. a roof comprising a front gable and a rear gable, said front gable being mounted on and supported by said front column pair, said rear gable being mounted on and supported by said rear column pair, said roof further comprising a first roof slope and a second roof slope abutting one another and attached to said front gable and said rear gable of said roof so as to form an apex of the roof;
   e. two removable side walls for attachment to said front column and said rear column;
   f. a removable rear wall for attachment to said rear column pair; and
   g. a removable front wall for attachment to said front column pair, said front wall having a section defining an opening for access to the pet shelter;
   whereby an open-air pet shelter is obtained by removing one or more of said side walls, said rear wall, and said front wall and a substantially enclosed pet shelter is obtained by attaching one or more of said side walls, said rear wall, and said front wall.

2. The pet shelter as claimed in claim 1, wherein said roof further comprises a ridgepole connected to said first roof slope and said second roof slope along the apex of said roof.

3. The pet shelter as claimed in claim 2, wherein said roof further comprises at least one triangular support piece attached to said roof slopes adjacent said ridgepole.

* * * * *